US008634307B2

(12) United States Patent
Thyagarajan et al.

(10) Patent No.: US 8,634,307 B2
(45) Date of Patent: Jan. 21, 2014

(54) MESSAGE FLOW REROUTING FOR AUTONOMOUS SELF-DISRUPTING NETWORK ELEMENT

(75) Inventors: Manikka Thyagarajan, Ottawa (CA); Michael H. Lashley, Chateauguay (CA); Suat R. Eskicioglu, Ottawa (CA); Csaba Marton, Ottawa (CA); Nausheen Naz, Ottawa (CA)

(73) Assignee: Alcatel Lucent, Paris (FR)

( * ) Notice: Subject to any disclaimer, the term of this patent is extended or adjusted under 35 U.S.C. 154(b) by 349 days.

(21) Appl. No.: 13/149,514

(22) Filed: May 31, 2011

(65) Prior Publication Data
US 2012/0309320 A1 Dec. 6, 2012

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
USPC .......... 370/245; 370/244; 370/410; 370/411; 370/412; 710/52; 710/55; 709/235

(58) Field of Classification Search
USPC .............. 370/241–245, 329, 410–412, 419, 370/465–467; 709/213, 232, 233, 235, 238; 710/105, 52–55
See application file for complete search history.

(56) References Cited

U.S. PATENT DOCUMENTS

| 2005/0286439 A1 | 12/2005 | Capelle et al. | |
|---|---|---|---|
| 2012/0257501 A1* | 10/2012 | Kucharczyk | 370/235 |
| 2012/0307626 A1* | 12/2012 | Thyagarajan et al. | 370/225 |
| 2012/0307642 A1* | 12/2012 | Naz et al. | 370/241 |
| 2012/0307643 A1* | 12/2012 | Naz et al. | 370/241 |
| 2012/0309320 A1* | 12/2012 | Thyagarajan et al. | 455/67.11 |
| 2012/0311178 A1* | 12/2012 | Naz et al. | 709/234 |
| 2012/0311205 A1* | 12/2012 | Thyagarajan et al. | 710/105 |

FOREIGN PATENT DOCUMENTS

CN 101833503 A 9/2010
EP 0528075 A1 2/1993

OTHER PUBLICATIONS

International Search Report and Written Opinion in related PCT/CA2012050334, Jul. 2012.

* cited by examiner

Primary Examiner — Michael Thier
Assistant Examiner — Benjamin H Elliott, IV
(74) Attorney, Agent, or Firm — Kramer & Amado, P.C.

(57) ABSTRACT

A method, apparatus, and machine readable storage medium is disclosed for establishing a test protocol processor which autonomously intercepts success path protocol messages at a network element port buffer and substitutes a corresponding failure path messages to simulate the introduction of unexpected protocol messages into the protocol message flow from an external source to the network element under test. Subsequent to intercepting messages, the test protocol processor may perform one or more of several actions according to the results of statistical calculations. These actions include allowing the message to drop, replacing the message after a delay, replacing the message after altering the payload of the message, and replacing the message after altering the message type. The disclosed autonomous self disrupting network element is particularly useful for providing a means to perform in situ field testing of network performance indicators under desired statistical conditions.

21 Claims, 7 Drawing Sheets

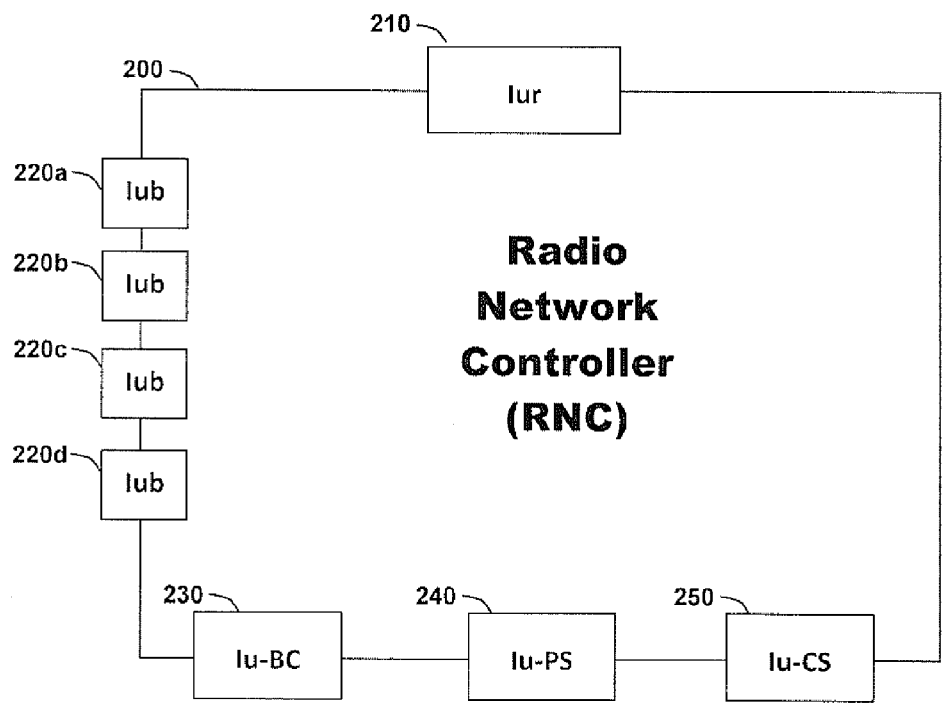
PRIOR ART  FIG. 2
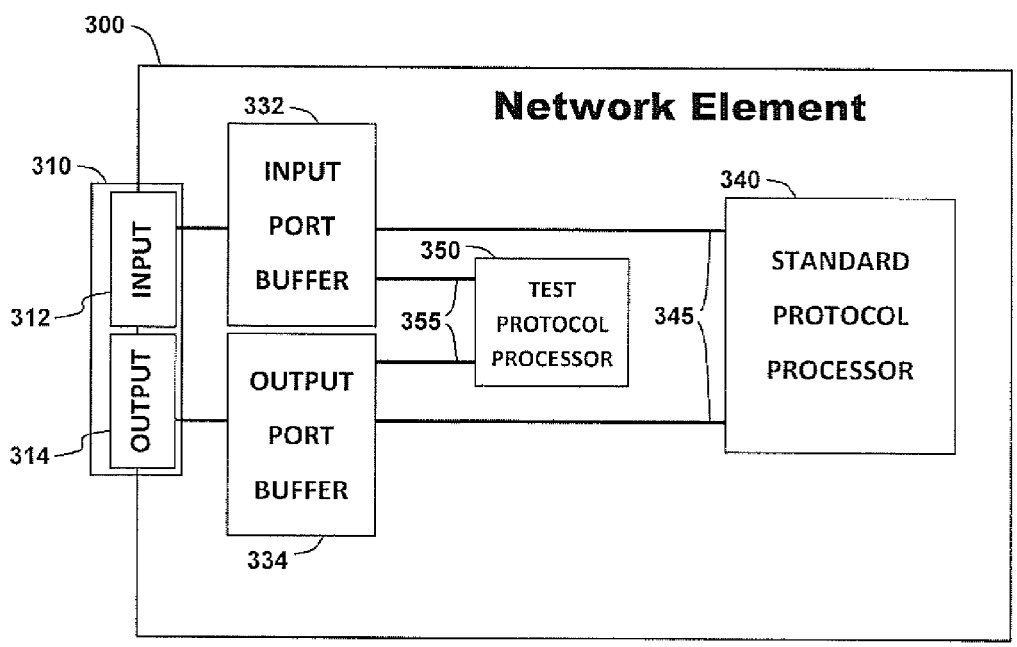
FIG. 3

MESSAGE FLOW REROUTING FOR AUTONOMOUS SELF-DISRUPTING NETWORK ELEMENT

CROSS-REFERENCE

This application cross-references the following co-pending application, incorporated by reference herein: application Ser. No. 13/149,473, "MESSAGE FLOW REROUTING FOR SELF-DISRUPTING NETWORK ELEMENT" to Thyagarajan et al., filed May 31, 2011.

This application cross-references the following co-pending application, incorporated by reference herein: application Ser. No. 13/149,370, "AUTONOMOUS SELF-DISRUPTING NETWORK ELEMENT" to Naz et al., filed May 31, 2011.

This application cross-references the following co-pending application, incorporated by reference herein: application Ser. No. 13/149,414, "AUTONOMOUS SELF-DISRUPTING NETWORK ELEMENT" to Naz et al., filed May 31, 2011.

This application cross-references the following co-pending application, incorporated by reference herein: application Ser. No. 13/149,316, "FIELD-DEPLOYABLE PROTOCOL MESSAGE INTERCEPTOR" to Thyagarajan et al., filed May 31, 2011.

This application cross-references the following co-pending application, incorporated by reference herein: application Ser. No. 13/149,556, "FIELD-DEPLOYABLE MESSAGE COMPROMISER" to Naz et al., filed May 31, 2011.

FIELD OF THE INVENTION

The invention relates to generally to network element equipment testing and is particularly concerned with autonomous substitution of success path protocol messages with failure path protocol messages during execution of test cases suitable for demonstrating the performance of network elements against performance indicators given certain statistical conditions.

BACKGROUND OF THE INVENTION

As demand increases for varying types of applications within mobile telecommunications networks, service providers constantly upgrade their systems in order to reliably provide an expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the internet protocol (IP) and directed toward a different, packet-switched core. This led to unique problems regarding application provision, metering and charging, and quality of experience (QoE) assurance.

Call drops and establishment failures are two of the major issues in wireless networks that impact end user experience and cause customer dissatisfaction. Metrics have been defined to track these statistics in the networks to evaluate network performance. These metrics are termed as Network Key Performance Indicators (N-KPI).

Demonstration of Network Key Performance Indicators as impacted by a particular network element is difficult to do. If a particular network element, such as for example a Radio Network Controller (RNC) of the Universal Mobile Telecommunications Services (UTMS) is situated in a test facility, then it is difficult to ensure that the test equipment which is exercising the RNC is providing conditions matching a particular customer network given the variety of network equipment that a given customer's network may present. On the other hand, once the network equipment is deployed into the customer's network the contextual conditions presented are representative, but disentangling the contributions, positive or negative, of the specific network equipment element becomes difficult due to interoperability effects.

As telecommunication systems become more complex, testing and verification of such systems also increases in complexity. In particular, more test cases are required to exercise various protocol message flows, such as for example, the flow of protocol messages between network elements to establish a call or establish a service between those elements, and in particular, various possible combinations of protocol message sequence that might occur in a real world situation. Thus it is important to be able to test the robustness of network elements to determine if the network elements can gracefully handle receiving incongruous, unexpected or invalid protocol messages. Typical protocol generators used in network test systems only generate protocol compliant messages producing success path responses to protocol messages received from network equipment under test.

In view of the foregoing, it would be desirable to provide a method to autonomously introduce failure scenarios in protocol message flows of protocol message based communications systems to test a network element in situ in a customer network. In particular, it would be desirable to provide a means by which the response of a particular network element to a plurality of problematic messaging conditions could be demonstrated under a given statistical regime.

SUMMARY OF THE INVENTION

According to one aspect of the invention there is provided a network element comprising: a port having a port buffer; a standard protocol processor which processes messages stored in the port buffer; and a test protocol processor having access to the port buffer; wherein the test protocol processor is configured to; generate a first value according to a first statistical distribution in the event that a first protocol message stored in the port buffer corresponds to a predetermined message type; compare the first value to a first threshold; remove the first protocol message from the port buffer if the first value is to one side of the first threshold; and replace the first protocol message in the port buffer with a corresponding failure path protocol message.

In some embodiments of the invention the test protocol processor is further configured to: generate a second value according to a second statistical distribution if the first value is to another side of the first threshold; compare the second value to a second threshold; associate a delay with the first protocol message if the second value is to one side of the second threshold; remove the first protocol message from the port buffer; and wherein the step of replacing the first protocol message with the corresponding failure path protocol message occurs after a period of the associated delay.

In some embodiments of the invention the test protocol processor is further configured to, prior to the replace step: generate a third value according to a third statistical distribution; compare the third value to a third threshold; associate a change in message contents with the failure path protocol message if the third value is to one side of the third threshold; and provide the associated change in message contents to the failure path protocol message.

In some embodiments of the invention the test protocol processor is further configured to, prior to the replace step: generate a fourth value according to a fourth statistical distribution; compare the fourth value to a fourth threshold; and associate a change in message type with the failure path protocol message if the fourth value is to one side of the fourth threshold; provide the associated change in message type to the failure path protocol message.

In some embodiments of the invention the associated change in message type is that of a failure response message.

In some embodiments of the invention the delay is chosen from a range of delays having a lower delay limit and an upper delay limit.

In some embodiments of the invention a probability of the delay being a particular delay is defined by a random distribution.

In some embodiments of the invention the random distribution is selected from the set of: a uniform random distribution, a truncated Normal random distribution, a truncated Poisson random distribution, and a truncated exponential random distribution.

In some embodiments of the invention the first statistical distribution is selected from the set of: a uniform random distribution, a truncated Normal random distribution, a truncated Poisson random distribution, and a truncated exponential random distribution.

In some embodiments of the invention the second statistical distribution is selected from the set of: a uniform random distribution, a truncated Normal random distribution, a truncated Poisson random distribution, and a truncated exponential random distribution.

In some embodiments of the invention the third statistical distribution is selected from the set of: a uniform random distribution, a truncated Normal random distribution, a truncated Poisson random distribution, and a truncated exponential random distribution.

In some embodiments of the invention the fourth statistical distribution is selected from the set of: a uniform random distribution, a truncated Normal random distribution, a truncated Poisson random distribution, and a truncated exponential random distribution.

In some embodiments of the invention the port buffer comprises an input port buffer of the network element; and the removing step occurs prior to the standard protocol processor processing the first protocol message.

In some embodiments of the invention the port buffer comprises an output port buffer of the network element and the removing step occurs prior to transmission of the failure path protocol message from the port.

In some embodiments of the invention the predetermined message type is one of a plurality of predetermined message types.

According to another aspect of the invention there is disclosed a method of testing a performance indicator for a network element having a port having a port buffer; a standard protocol processor which processes messages stored in the port buffer; a test protocol processor having access to the port buffer, and the test protocol processor is configured to execute the method. The method comprises the steps of: generating a first value according to a first statistical distribution in the event that a first protocol message stored in the port buffer corresponds to a predetermined message type; comparing the first value to a first threshold; removing the first protocol message from the port buffer if the first value is to one side of the first threshold; and replacing the first protocol message in the port buffer with a corresponding failure path protocol message.

Some embodiments of the invention further comprise steps of: generating a second value according to a second statistical distribution if the first value is to another side of the first threshold; comparing the second value to a second threshold; associating a delay with the first protocol message if the second value is to one side of the second threshold; removing the first protocol message from the port buffer; and wherein the step of replacing the first protocol message with the corresponding failure path protocol message occurs after a period of the associated delay.

Some embodiments of the invention further comprise steps of: generating a third value according to a third statistical distribution; comparing the third value to a third threshold; associating a change in message contents with the failure path protocol message if the third value is to one side of the third threshold; and providing the associated change in message contents to the failure path protocol message.

Some embodiments of the invention further comprise steps of, prior to the replace step: generating a fourth value according to a fourth statistical distribution; comparing the fourth value to a fourth threshold; and associating a change in message type with the failure path protocol message if the fourth value is to one side of the fourth threshold; providing the associated change in message type to the failure path protocol message.

In some embodiments of the invention the port buffer comprises an input port buffer of the network element; and the removing step occurs prior to the standard protocol processor processing the first protocol message.

In some embodiments of the invention the port buffer comprises an output port buffer of the network element and wherein the test protocol processor replaces the first protocol message prior to transmission of the failure path protocol message from the port.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which:

FIG. 2 illustrates an exemplary Radio Network Controller (RNC) with associated communication ports;

FIG. 3 illustrates an exemplary network element according to an embodiment of the invention;

DETAILED DESCRIPTION

Figure 1:
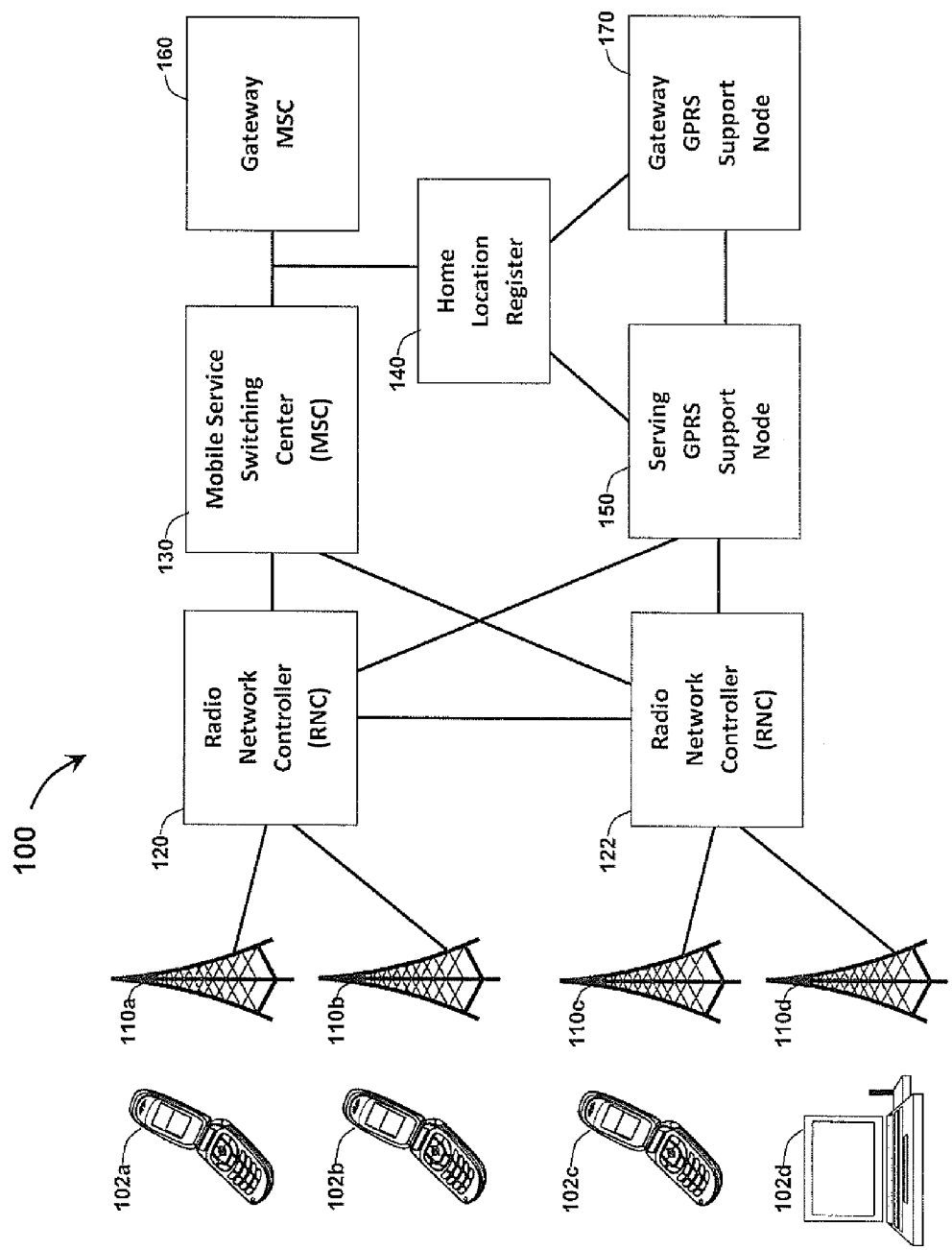
FIG. 1 illustrates an exemplary Universal Mobile Telecommunications Services (UMTS) network for providing various mobile services.

Referring now to the drawings, in which like numerals refer to like components or steps, there are disclosed broad aspects of various exemplary embodiments.

In use the invention is situated in a piece of network equipment (network element) which acts as a node in a network of network equipment. In FIG. 1 there may be seen a simplified block diagram 100 of a portion of a Universal Mobile Telecommunications Services (UMTS) network. Within this network may be found examples of network equipment such as Radio Network Controllers (RNCs) 120 and 122; Mobile Service Switching Centre (MSC) 130; Serving GPRS Support Node 150; Home Location Register Node 140, Gateway Mobile Switching Center 160; and Gateway GPRS Support Node 170. The Radio Network Controllers are connected to base stations 110, in FIG. 1 RNC 120 to NodeB base stations 110a and 110b; and RNC 122 to NodeB base stations 110c and 110d, NodeB base stations can be in radio contact with user equipment 102, depicted in FIG. 1 as handsets 102a, 102b, 102c, and computer equipment with radio connection 102d.

In operation the network elements communicate via connections which bind the individual network element to other network elements to form the overall network. The interfaces between network elements terminate on ports of each individual network element. According to the protocol of the specific network, particular messages are exchanged between network elements over the connections in order to accomplish various network functions such as setting up a call, handing off a connection, connecting a particular user equipment to a particular service, etc.

Referring now to FIG. 2 there may be seen a block diagram depicting the ports associated with an example Radio Network Controller network element 200 corresponding to references 120 and 122 of FIG. 1. As per the UMTS specification, RNC 200 has a plurality of ports by which it interfaces connections to other network elements. For the purposes of this explanation, the logical connections between network elements will be termed interfaces. The interface between RNCs, for example RNC 220 and RNC 222 of FIG. 1 is termed the Iur interface and may be seen on FIG. 2 as port 210 of RNC 200. The interface between the RNC and the NodeB units is termed the Iub interface and may be seen on FIG. 2 as ports 220a, 220b, 220c, and 220d of RNC 200. The interface between the RNC and the Cell Broadcast Center (CBC) is termed the Iu-BC interface and may be seen as port 230 of RNC 200. The interface between the RNC and the Serving GPRS Support Node (SGSN) is termed the Iu-PS interface as may be seen as port 240 of RNC 200. The interface between the RNC and the Mobile Switching Center is termed the Iu-CS interface as may be seen as port 250 of RNC 200. Messages over an interface are transmitted and received at ports and will be stored in port buffer memories as discussed regarding the next figure.

Referring to FIG. 3 there may be seen a block diagram of an exemplary network element 300 according to an embodiment of the invention. Network element has an interface port 310 having an input port 312 and output port 314. Messages arriving at interface input port 312 are stored in input port buffer 332. Likewise, messages destined for transmission from interface output port 314 are stored in output port buffer 334.

Standard protocol processor 340 is connected to input port buffer 332 and output port buffer 334 via connections 345. Standard protocol processor 340 represents the hardware and hardware-with-software components of the network element 300 which processes messages received at the interface ports according to a particular protocol to which the incoming messages correspond and which generates messages for transmission from the interface ports also according to a particular protocol to which the outgoing messages correspond.

Standard protocol processor 340 retrieves a message from input port buffer 332, processes the message according to protocol, generates a response message (which may be for an interface port other than the interface port the message was received on), and places the response message into an output port buffer. If the outgoing message is for a second interface port other than a first interface port at which the message was received, then the output port buffer used will be the output port buffer associated with the second interface port.

Also connected to input port buffer 332 and output port buffer 334 via connections 355 is test protocol processor 350. Test protocol processor 350 represents the hardware and hardware-with-software components of the network element 300 which processes messages received at the interface ports and which generates messages for transmission from the interface ports according to the invention. Portions of the test protocol processor 350 may be coterminous with standard protocol processor 340, for example certain elements of hardware such as CPUs or memory may be commonly used by both protocol processors.

According to one embodiment of the invention, in operation test protocol processor 350 monitors input port buffer 332 and under certain conditions removes a message stored within input port buffer 332 prior to standard protocol processor 340 having retrieved it. Subsequently, test protocol processor 350 may replace the message with a failure path message as will be described in more detail below. In some embodiments test protocol processor 350 may replace the message after a delay; may alter the payload of the message and then replace the message; may alter the header of the message and then replace the message; or may not replace the message, effectively dropping the message.

The net result of each of these effects is to change the message flow to a failure path message flow and additionally to further change the message, either in contents or in terms of arrival time, in order to examine the response of either the network element 300, or the response of the larger network in which network element 300 is a node. The nature of these changes allows testing of the network element or the larger network in-situ with specifically prescribed failure path messages and specifically prescribed message compromising instances. These message compromising instances may be representative of, for example, network delays which may occur in the normal course of network operation.

According to one embodiment of the invention, test protocol processor 350 may replace a particular message in the port input buffer with a corresponding failure path message after a delay chosen from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

Figure 4:
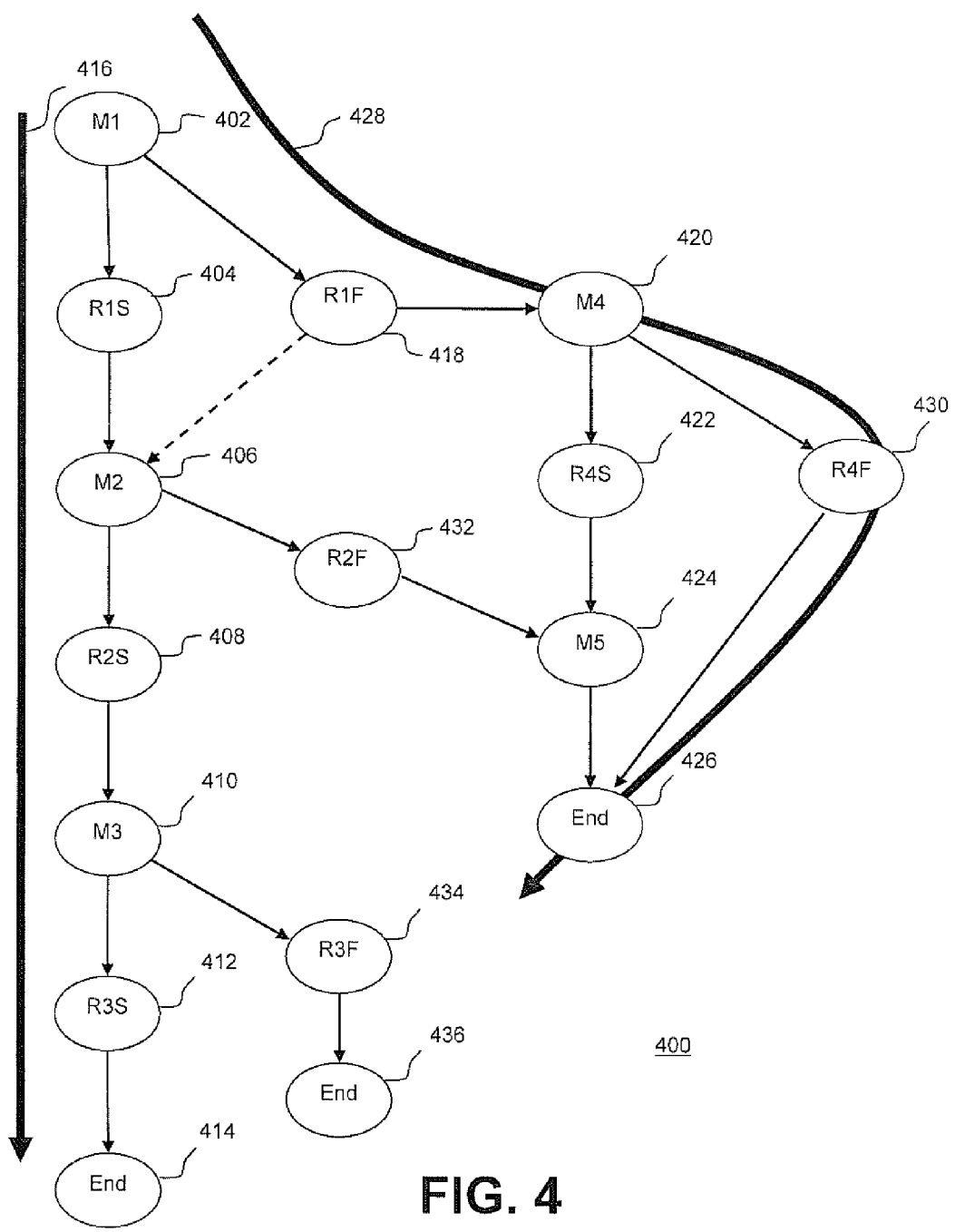
FIG. 4 illustrates a message flow diagram according to an embodiment of the present invention.

FIG. 4 depicts an exemplary generic message flow 400 of protocol messages exchanged between two network elements. With reference to FIG. 3 and to FIG. 4, during the course of establishing a communication service for example, specific messages need to be exchanged between the two network elements to successfully establish the communication service. These messages are received at input port 312, buffered in input port buffer 332 and parsed by standard protocol processor 340 as described previously. The response message is assembled by standard protocol processor 340 presented to output port buffer 334 for transmission by output port 314. Thus viewing the protocol message flow of FIG. 4 from the point of view of a single network element 300 in this example, the network element 300 might send message M1 (402) to initiate the service establishment process and expects to receive at input port buffer 332 through input port 312 from an external network element, a success path response message R1S (404), acknowledging the initiation request. In response to the received acknowledgement message, the network element 300 then sends message M2 (406) to continue the setup process. When the network element 300 receives another success path protocol message R2S (408), the process continues by the network element 300 transmitting message M3 (410), receiving success path response message R3S (412) and so forth until the protocol message sequence is completed at 414 and the communication service is successfully established. This successful flow of messages to complete the task, in this example, establishing a communication service, is referred to as a success path message flow 416.

In order to exercise various scenarios such as receiving incongruous, unexpected or invalid protocol messages that network element 300 might encounter in the real world, an embodiment of the present invention provides the ability to substitute a success path response protocol message received at input port buffer 332 with a failure path protocol message. This can be accomplished using a reroute library table. A generic reroute library table is shown in Table 1. The first column lists possible success path messages for a port on a network element. The second column lists corresponding failure path messages which could be substituted for the success path messages on the same row of the table. When an embodiment of the present invention is enabled, if a received success path message matches an entry in the first column of Table 1, it will be replaced by the corresponding failure path message found in the same row of the second column.

TABLE 1

| Success Path Message | Failure Path Message |
|---|---|
| R1S | R1F |
| R2S | R2F |
| R3S | R3F |
| R4S | R4F |

Thus in the example of FIG. 4, when the network element 300 receives success path response message R1S (404), test protocol processor 350 intercepts the incoming protocol message presented at input port buffer 332 before standard protocol processor 340 processes the message. Test protocol processor 350 removes success path response message R1S (404) from input port buffer 332 and replaces it with a corresponding failure path protocol message R1F (418). This message substitution is performed by test protocol processor 350 with the aid of a reroute library table. Standard protocol processor 340 then retrieves protocol message R1F (418) and processes it according to the protocol stack implemented in standard protocol processor 340. For example, standard protocol processor 340 might respond to failure path protocol message R1F (418) by transmitting an appropriate protocol message M4 (420) via output port buffer 334 and output port 314. An appropriate response from an external network element might be message R4S (422). Thus if network element 300 receives message R4S (422), test protocol processor 350 intercepts the incoming protocol message presented at input port buffer 332 before standard protocol processor 340 processes the message. Test protocol processor 350 removes success path response message R4S (422) from input port buffer 332 and replaces it a corresponding failure path protocol message R4F (430). In this example, the message sequence might end at this point (426). This message flow of protocol messages diverges from a success path 416 by introducing protocol messages in the protocol message exchange that diverges from a success path message flow and is termed as a failure path message flow 428.

The above description describes an embodiment of the invention operating on input port buffer 332 of network element 300 and the success path messages are inbound messages detected at the input port buffer 332 and the failure path messages substituted are messages inbound to the network element 300. Advantageously this embodiment provides the ability to exercise various failure path scenarios for network element 300. In the context of a laboratory test environment, network element 300 can be tested using a test system to simulate network conditions and executing predefined test cases in a controlled environment. Advantageously, this embodiment can also be used to exercise network element in-situ in a real-world network to determine if the network element can gracefully handle receiving incongruous, unexpected or invalid protocol messages in real-world conditions.

Embodiments of the present invention provide an autonomous self-disrupting network element wherein the network element itself can disrupt protocol messages received at the network element or transmitted from the network element. The use of randomizing functionality facilitates the autonomous generation of various failure path messages to exercise the functioning of the network element when subjected to incongruous, unexpected or invalid protocol messages.

In operation the test protocol processor 350 is enabled as part of a testing scenario. The enabling could be via specific operator instructions or automatically in response to an automatic test routine. As per normal network test procedures, responses of the network element 300 and interacting network elements would be captured in a trace file and logged in a database for later analysis.

In some embodiments of the invention, functionality of the test protocol processor 350 can be enabled for testing purposes and then disabled before delivery to a customer. In other embodiments the functionality can be enabled for use by a customer in a deployed communication network.

In some embodiments, the reroute library table is configured to enable/disable specific rows such that when a success path message is received at the port buffer which matches a success path message in the table and the corresponding row is enabled, message substitution takes place and if the row is disabled, the test protocol processor takes no action and the standard protocol processor handles the received message normally.

In another embodiment of the invention, test protocol processor 350 operates on output port buffer 334 and the test protocol processor 350 substitutes or removes the protocol message from output port buffer 334 prior to transmission of the protocol message from the port 314. In this embodiment, Table 1 would reflect outgoing messages from network element 300, thus outbound success path messages would be detected at the output port buffer 334 and substituted with corresponding outbound failure path messages. Advantageously this embodiment provides the ability to exercise various failure path scenarios for an external network element in communication with network element 300 via a port on network element 300. In the context of a testing scenario, a test system can execute predefined test cases in a controlled environment while network element 300 can be used to introduce unexpected protocol messages into the protocol message flow to simulate network impairments and other network conditions. Advantageously, this embodiment can also be used to exercise an external network element in-situ in a real-world network to determine if the external network element can gracefully handle receiving incongruous, unexpected or invalid protocol messages in real-world conditions. As per normal network test procedures, responses of external network element and network element 300 would be captured in a trace file and logged in a database for later analysis.

In other embodiments of the invention, test protocol processor 350 operates on multiple input and/or output buffers. A reroute library table can be implemented for each interface port of any network element handling protocol messages. Thus for the RNC of FIG. 2, a reroute library table can be implemented for each of the ports Iur (210), Iub (220*a*), Iub (220*b*), Iub (220*c*), Iub (220*d*), Iu-PS (240), IU-CS (250). For UMTS/3GPP networks, a reroute library table can be implemented for each of the ports of other network elements such as User Equipment (UE); Node Bs, Mobile Service Switching Centers (MSC), Gateway GPRS Support Nodes, Gateway MSCs, etc. Additionally, a reroute library table can be implemented for input port buffer and/or for an output port buffer for each interface port.

Examples of network technologies using protocol messaging and suitable for application of the present invention include Cdma2000, UMTS and LTE.

Table 2 illustrates an example of a reroute table for an embodiment of the invention directed to handling inbound Radio Resource Control (RRC) protocol messages at an Iub interface of a UMTS Radio Network Controller (RNC).

TABLE 2

| Success Path Message Inbound at Iub interface of RNC | Substitute Failure Path Message Inbound at Iub interface of RNC |
|---|---|
| MEASUREMENT REPORT | MEASUREMENT CONTROL FAILURE |
| PHYSICAL CHANNEL RECONFIGURATION | PHYSICAL CHANNEL RECONFIGURATION FAILURE |
| RADIO BEARER RECONFIGURATION COMPLETE | RADIO BEARER RECONFIGURATION FAILURE |
| RADIO BEARER RELEASE COMPLETE | RADIO BEARER RELEASE FAILURE |
| RADIO BEARER SETUP COMPLETE | RADIO BEARER SETUP FAILURE |
| SECURITY MODE COMPLETE | SECURITY MODE FAILURE |
| TRANSPORT CHANNEL | TRANSPORT CHANNEL |

TABLE 2-continued

| Success Path Message Inbound at Iub interface of RNC | Substitute Failure Path Message Inbound at Iub interface of RNC |
|---|---|
| RECONFIGURATION COMPLETE | RECONFIGURATION FAILURE |
| UTRAN MOBILITY INFORMATION CONFIRM | UTRAN MOBILITY INFORMATION FAILURE |
| HANDOVER FROM UTRAN COMPLETE | HANDOVER FROM UTRAN FAILURE |
| ACTIVE SET UPDATE | ACTIVE SET UPDATE FAILURE |

Table 3 illustrates an example of a reroute table for an embodiment of the invention directed to handling outbound Radio Resource Control (RRC) protocol messages at an Iub interface of a UMTS Radio Network Controller (RNC).

TABLE 3

| Success Path Message Outbound at Iub interface of RNC | Substitute Failure Path Message Outbound at Iub interface of RNC |
|---|---|
| RRC CONNECTION SETUP | RRC CONNECTION REJECT |
| RADIO BEARER SETUP | SIGNALLING CONNECTION RELEASE |
| RADIO BEARER RECONFIGURATION | SIGNALLING CONNECTION RELEASE |
| PAGING TYPE 2 | RRC CONNECTION RELEASE |

After detecting a success path message at the port which has a matching entry in the first column of the reroute library table test protocol processor 350 parses the success path message to extract fields required to build the corresponding failure path message. In the case of 3GPP protocol messages the following fields are captured: Logical_channel_type, MessageType, rrc_TransactionIdentifier, integrityProtectionModeInfo.

The described embodiments simulate the introduction of unexpected protocol messages from an external source to the network element under test into the protocol message flow which can be advantageous in a testing scenario in which it is desired to exercise the functioning of the network element when subjected to incongruous, unexpected or invalid protocol messages to verify the robustness of network elements to determine if the network elements can gracefully handle receiving incongruous, unexpected or invalid protocol messages.

Referring to FIG. 5 there may be seen a variety of random statistical distributions. In FIG. 5*a* a uniform random distribution is depicted, having a delay range with a lower delay limit 512 and an upper delay limit 514 and having an instantaneous probability 510 throughout the range. A specific delay value 516 is depicted as might result from a delay selection according to this statistical distribution.

Figure 5A:
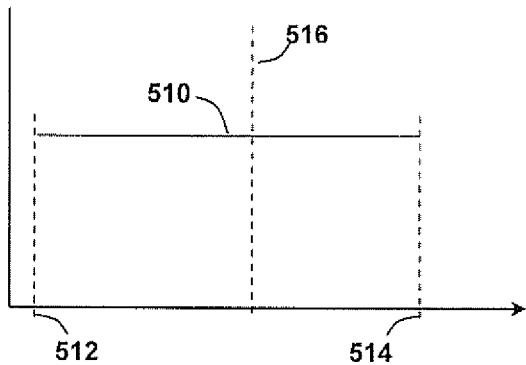
FIGS. 5a, 5b, 5c and 5d illustrates a set of exemplary statistical distributions used in generating a random value.
Figure 5B:
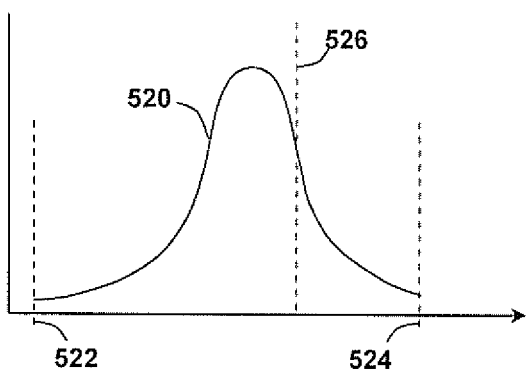

In FIG. 5*b* a truncated Normal random distribution is depicted, having a delay range with a lower delay limit 522 and an upper delay limit 524 and having an instantaneous probability 520 throughout the range. A specific delay value 526 is depicted as might result from a delay selection according to this statistical distribution.

Figure 5C:
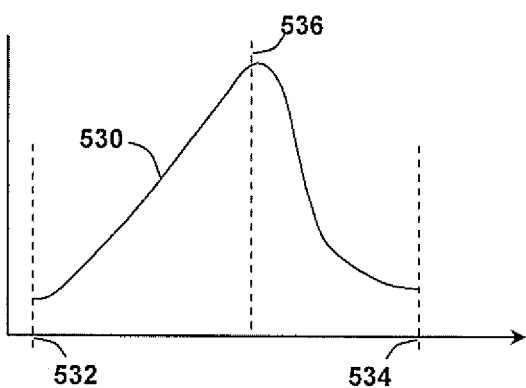

In FIG. 5*c* a truncated Poisson random distribution is depicted, having a delay range with a lower delay limit 532 and an upper delay limit 534 and having an instantaneous probability 530 throughout the range. A specific delay value 536 is depicted as might result from a delay selection according to this statistical distribution.

Figure 5D:
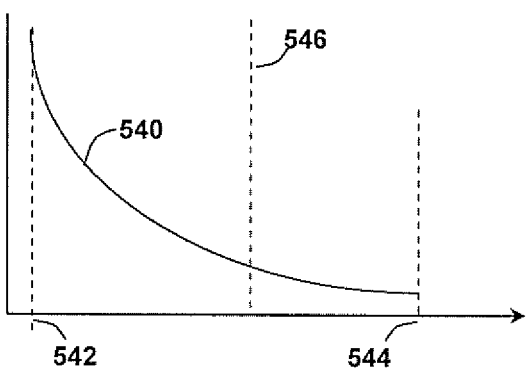

In FIG. 5*d* a truncated Exponential random distribution is depicted, having a delay range with a lower delay limit 542 and an upper delay limit 544 and having an instantaneous probability 540 throughout the range. A specific delay value 546 is depicted as might result from a delay selection according to this statistical distribution.

In application of these embodiments of the invention, the particular random statistical distribution may be chosen to represent the sort of distribution previously observed for messages in the particular network in which the network element of the invention is situated. Alternatively, the distribution may be chosen to demonstrate a particular performance response of the network element.

For example, under some circumstances it may be advantageous to select an appropriate distribution and then provide an upper limit representative of the average delay time. The resulting set of delays would be representative of messages arriving with delays at or below average. The response of the network element under test could be used to demonstrate the degree of impact on Key Performance Indicators that this particular network element contributes when the network is performing at average or below delay times.

According to another embodiment of the invention, the test protocol processor alters the payload of the message prior to returning the message to the input port buffer. This form of test could, for example, be used to evaluate the network element's response to erroneous content values contained in messages, in terms of recovery times and recovery paths taken.

Alternatively, according to another embodiment of the invention, the test protocol processor alters the message header, changing the message type. The alteration could be, for example, the substitution of a failure message in place of the received message. This form of test again could be used to evaluate the network element's response to failure messages, in terms of recovery times and recovery paths taken.

According to yet another embodiment of the invention, the test protocol processor does not return any message to the input port buffer. This form of test would represent the case where an incoming message was dropped.

Under one embodiment of the invention, the conditions under which the test protocol processor would remove a message from the input port buffer are defined in a reference table. The test protocol processor scans arriving messages and when a message corresponds to a message in the reference table, would remove the message from the input port buffer and take an action as correspondingly defined in the reference table. As aforementioned, the kind of actions could include delaying the particular message, changing the payload contents of the message, changing the message type, or even dropping the message. In some embodiments the reference table contains further particulars, for example if a delay is to be incurred by the message the reference table could detail a specific delay or a range of delays. The range could be specified by an upper and lower limit or could also or independently consist of a function reference to a particular type of random distribution with particular characteristics.

In operation the test protocol processor 350 is enabled as part of a testing scenario. The enabling could be via specific operator instructions or automatically in response to an automatic test routine.

According to another embodiment of the invention, in operation test protocol processor 350 monitors output port buffer 334 and under certain conditions removes a message stored within output port buffer 334 prior to the message being sent out over the interface over output port 314. Subsequently, test protocol processor 350 may replace the message after a delay; may alter the payload of the message and then replace the message; may alter the header of the message and then replace the message; or may not replace the message, effectively dropping the message.

The net result of each of these effects is to change the message, either in contents or in terms of arrival time, in order to examine the response of the network element adjacent to network element 300, and additionally the response of the larger network in which the network element adjacent to network element 300 is a node. The embodiment of the invention provides a means of testing adjacent network elements which do not have an embodiment of the invention therein, thus extending the use of the invention.

As per the message delays and alterations, or even message drops, performed on messages in the input port buffer 332, in this embodiment of the invention the test protocol processor may apply all of the same message modifications as previously disclosed in relation to input port buffer 332.

In operation these modifications, delays, and dropping of messages in output port buffer 334 could be triggered by particular message types defined in a reference table. Associated with each message type would be the particular operation that the test protocol processor 350 would perform, including specifics of for example: delay times; message payload changes; message type changes; and instances where the message is to be dropped.

As per the earlier embodiments, in operation the test protocol processor 350 is enabled as part of a testing scenario. The enabling could be via specific operator instructions or automatically in response to an automatic test routine.

As per normal network test procedures, responses of the network element 300 and interacting network elements would be captured in a trace file and logged in a database for later analysis.

According to another embodiment of the invention the operation of the test protocol processor is made dependent upon a random statistic in the event that it identifies a predetermined message. The application of the random statistic may occur once or multiple times in determining what operation the test protocol process will take. According to one version of this embodiment, a value is determined according to a random or pseudo-random process. The value is then compared to a threshold value. If the determined value is to one side of the threshold value, for example greater than the threshold value, then the operation of the test protocol processor may be to ignore the presence of the predetermined message in this instance. In the event that the determined value is equal or to the other side of the threshold value, then the operation of the test protocol processor may be to remove the message from the port buffer. In this embodiment a random statistic is used to establish the frequency of the test protocol processor interacting with the port buffer in the event that a predetermined message type is placed in the buffer. In this embodiment the random statistic determines whether a message is removed from the port buffer at all, thus potentially curtailing the addition of delays or modification of the message.

According to another embodiment of the invention, the provision of a delay is made contingent upon a random statistic. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after some determined delay. In some versions of this embodiment the delay may be a particular fixed value, while in other versions the delay period may be determined by choosing a delay from a random distribution of delay times. This random distribution may have a defined lower limit and a defined upper limit representative of the range of delays that could be incurred for messages arriving at this port. Further, the random distribution of delay times could be defined by some standard statistical distribution including a uniform random distribution, a truncated Normal random distribution, a truncated Poisson random distribution, or a truncated exponential random distribution.

According to another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the payload of the message.

According to another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the payload of the message. Alternatively this operation may be triggered by the determined value being equal to or to the other side of the threshold value, for example less than or equal to the threshold value.

According to yet another embodiment of the invention the operation of the test protocol processor is made dependent upon a random statistic in the event that it identifies a predetermined message. According to one version of this embodiment, a value is determined according to a random or pseudo-random process. The value is then compared to a threshold value. If the determined value is to one side of the threshold value, for example greater than the threshold value, then the operation of the test protocol processor may be to remove the message from the port buffer and return the message after modifying the header of the message. This operation would be used in conjunction with changing the message type, for example to that of a failure message. Alternatively this operation may be triggered by the determined value being equal to or to the other side of the threshold value, for example less than or equal to the threshold value.

According to an embodiment of the invention, a series of tests are made against a random or pseudo-random statistic and the cumulative results of the individual tests determine in sum what operations the test protocol processor performs on a message in a port buffer.

Figure 6:
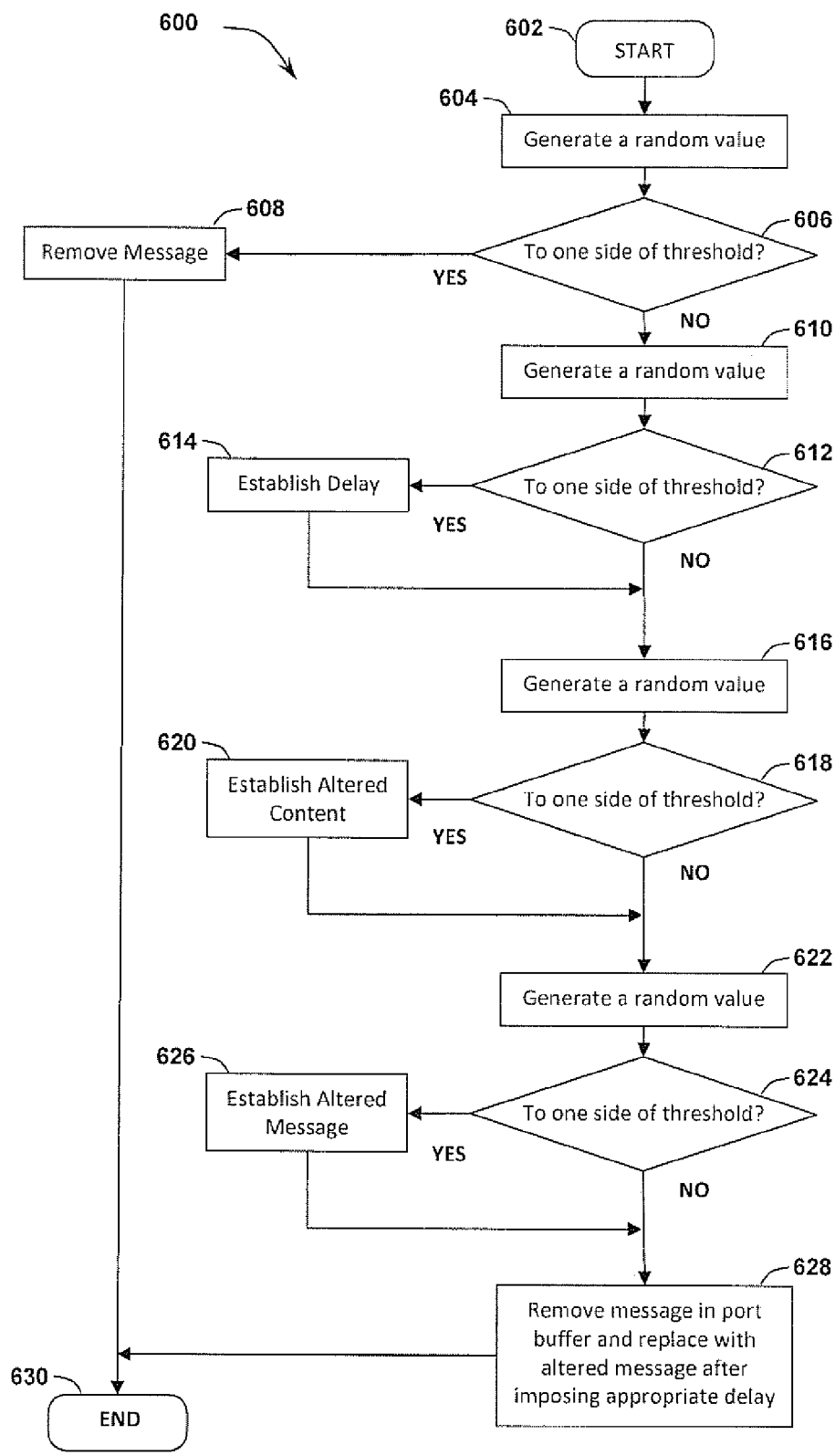
FIG. 6 illustrates a process flow diagram according to an embodiment of the invention.

By way of example, and referring now to FIG. 6 there may be seen a process flow diagram 600 providing a method according to a version of this embodiment of the invention.

The process commences at step 602. At step 604 a first random value is generated. This first generated value is compared to a first reference threshold at step 606 and if the first random value is to one side of the first reference threshold, then control proceeds to step 608 where the message is removed from the port buffer. Control then proceeds to step 630 where the process ends. This particular path through the process would represent an instance where a message would be removed from the port buffer and dropped.

In the event that step 606 determined that the first random value was to the other side or equal to the first threshold, control proceeds from step 606 to step 610 where a second random value is generated. This second generated value is compared to a second reference threshold at step 612 and if the second random value is to one side of the second reference threshold, then control proceeds to step 614 where a particular delay is established. This delay may be established via reference to a reference table or may be a delay generated from a statistical distribution, for example any distributions of the forms described in FIG. 4. Control then proceeds to step 616.

In the event that step 612 determined that the second random value was to the other side or equal to the second threshold, control proceeds from step 612 to step 616. At step 616 a third random value is generated. This third generated value is compared to a third reference threshold at step 618 and if the third random value is to one side of the third reference threshold, then control proceeds to step 620 where a particular altered content for the message is established. Control then proceeds to step 622.

In the event that step 618 determined that the third random value was to the other side or equal to the third threshold, control proceeds from step 618 to step 622. At step 622 a fourth random value is generated. This fourth generated value is compared to a fourth reference threshold at step 624 and if the fourth random value is to one side of the fourth reference threshold, then control proceeds to step 626 where a particular altered header for the message is established. The altered header will change the message type. In some cases the message type could be changed to that of a failure message. Control then proceeds to step 628.

In the event that step 624 determined that the fourth random value was to the other side or equal to the fourth threshold, control proceeds from step 624 to step 628.

At step 628 the message in the port buffer is removed and replaced with the altered message resulting from steps 620 and 626 after imposing the particular delay determined at step 614. Note that the resulting replacement message may incur only a delay, only a payload contents alteration, only a header alteration, or any combination of these conditions, dependent upon the random values generated and the results of the test steps. Control then proceeds to step 630 where the process ends.

Accordingly, this embodiment of the invention uses a cascaded set of tests using random distributions to determine what alterations and delays are to be imposed upon a particular message. This embodiment may find preferable application wherein the statistical distributions for the frequency of a dropped message, a delayed message, a message with altered contents, and a message with altered type are known and different. As each statistical distribution is independently applied, this embodiment allows individual adjustment of the distributions determining the application of the particular condition.

Figure 7:
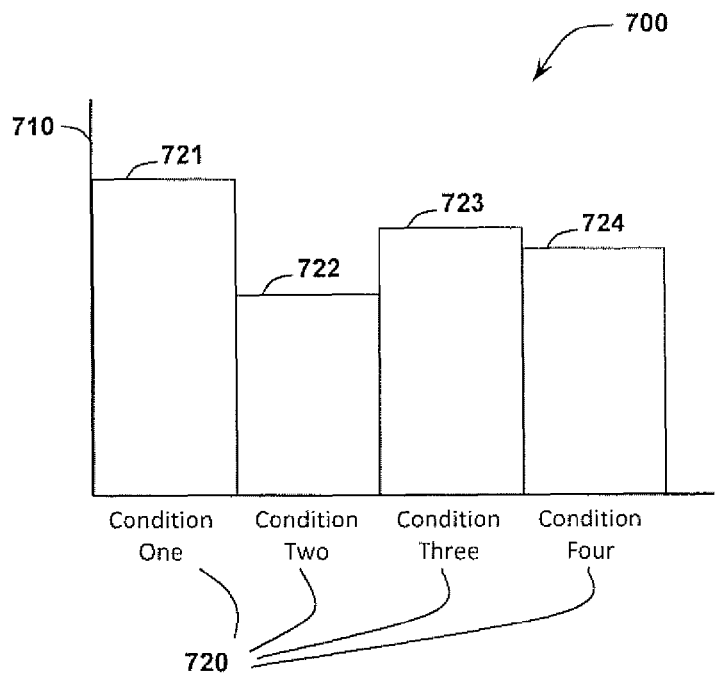
FIG. 7 illustrates a weighted statistical distribution according to an embodiment of the invention.

According to a different embodiment of the invention, a different form of determination according to a random distribution is used. Referring now to FIG. 7 there may be seen a distribution 700 having a statistical likelihood value as per axis 710 and distinct likelihoods 721, 722, 723, and 724. These distinct likelihoods are each respectively associated with conditions 720. In operation the distribution 700 defines the likelihood that one of the particular conditions would be applied to a given predetermined message. For example, condition one could represent the case of dropping the message and have a likelihood of 25%. Condition two could represent the case of delaying the message and have a likelihood of 20%. Condition three could represent the case of altering the message contents and have a likelihood of 26%. Condition four could represent the case of altering the message header (message type) and have a likelihood of 24%.

In this embodiment a single statistical distribution, distribution 700, is used to determine which condition will be applied to the message. Due to the separate conditions specified in distribution 700, only one of the conditions will be applied to a predetermined message in this embodiment.

Figure 8:
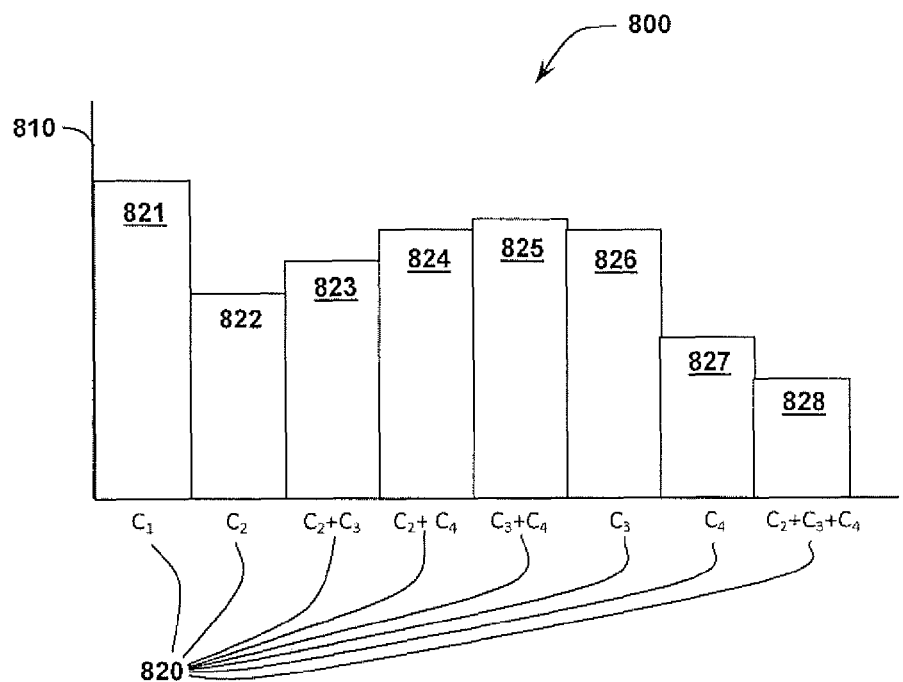
FIG. 8 illustrates a weighted statistical distribution according to a different embodiment of the invention.

Referring to FIG. 8 there is depicted an alternate statistical distribution 800 which provides for a single statistical distribution allowing multiple conditions to be applied to a replacement message. In FIG. 8 there may be seen a distribution 800 having a statistical likelihood value as per axis 810 and distinct likelihoods 821, 822, 823, 824, 825, 826, 827, and 828. These distinct likelihoods are each respectively associated with situations 820. Each situation of situations 820 is associated with the application of one or more conditions, and each situation is associated with a respective likelihood. By way of example, allow condition $C_1$ to represent dropping a message, $C_2$ to represent delaying a message, $C_3$ to represent altering a message contents, and $C_4$ to represent altering a message's header or message type. Then, likelihood 821 which corresponds to $C_1$ is the likelihood of dropping a message according to distribution 800. Likewise, likelihood 822 which corresponds to $C_2$ is the likelihood of simply delaying a message according to distribution 800, while likelihood 823 which corresponds to conditions $(C_2+C_3)$ is the likelihood of both delaying a message and altering the message's payload, and likelihood 828 which corresponds to conditions $(C_2+C_3+C_4)$ is the likelihood of delaying a message and altering the message's payload contents and type. In operation the distribution 800 defines the likelihood that one particular set of combinations of the particular conditions would be applied to a given predetermined message.

In this embodiment a single statistical distribution, distribution 800, is used to determine which set of conditions will be applied to the message. Due to the separate situations specified in distribution 800, each particular combinatorial set of the conditions can have a separate likelihood assigned.

Figure 9:
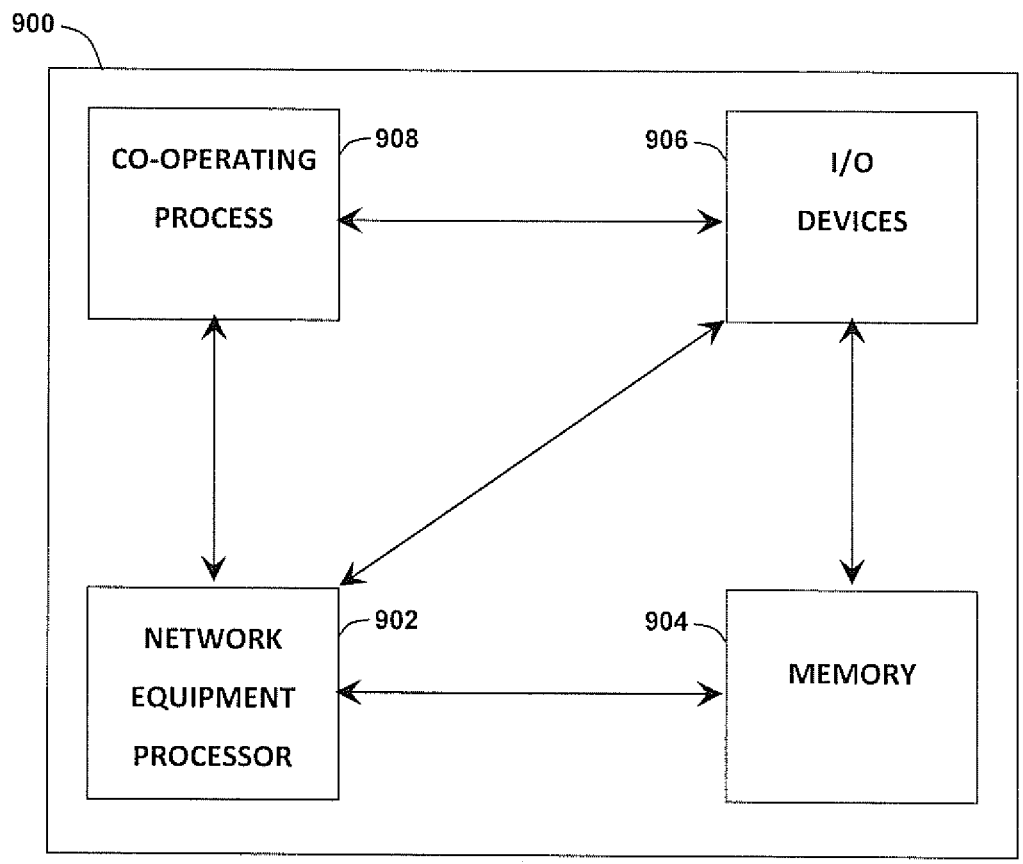
FIG. 9 illustrates an exemplary network element processor assembly according to an embodiment of the invention.

FIG. 9 depicts a high-level block diagram of a network equipment processor assembly suitable for use in performing functions described herein.

As depicted in FIG. 9, network equipment processor assembly 900 includes a network equipment processor element 902 (e.g., a central processing unit (CPU) and/or other suitable processor(s)), a memory 904 (e.g., random access memory (RAM), read only memory (ROM), and the like), a cooperating module/process 908, and various input/output devices 906 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 908 can be loaded into memory 904 and executed by network equipment processor 902 to implement the functions as discussed herein. As well, cooperating process 908 (including associated data structures) can be stored on a tangible, non-transitory computer readable storage medium, for example magnetic or optical drive or diskette, semiconductor memory and the like.

Accordingly, what has been disclosed is an apparatus and associated method which provides for the statistical control of the removal of messages from port buffers and subsequent dropping, delaying or alteration of the messages prior to their return to the port buffer. According to some embodiments of the invention the statistical control is performed on an event by event basis by making separate statistical determinations as to whether a message drop, message delay, message payload change or message header or type change occurs. According to other embodiments a single test is made against a predetermined distribution which defines the likelihoods of a single condition being applied. In other embodiments a single test is made against a predetermined distribution which defines the likelihoods of particular combinations of conditions being applied. In all the embodiments, in the event that the port buffer is an input port buffer, the message removal, alteration and replacement (if the message is not dropped) is done prior to the standard protocol processor of the network element having retrieved the message from the input port buffer. In the event that the port buffer is an output port buffer, the message removal, alteration and replacement (if the message is not dropped) is done prior to the message being transmitted from the output port buffer. Thus, what has been provided is a method to test a network element in situ in a customer network. In particular, a means has been disclosed by which the response of a particular network element to a plurality of problematic messaging conditions could be demonstrated under predetermined statistical regimes.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions. It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

The same applies to the term "implementation." Numerous modifications, variations and adaptations may be made to the embodiment of the invention described above without departing from the scope of the invention, which is defined in the claims.

What is claimed is:

1. A network element comprising:
a port having a port buffer;
a standard protocol processor which is configured to process messages stored in said port buffer; and
a test protocol processor having access to said port buffer, wherein said test protocol processor is configured to generate a first value according to a first statistical distribution when a first protocol message stored in said port buffer corresponds to a predetermined message type, compare said first value to a first threshold to determine if the first protocol message passes or fails a first test, remove said first protocol message from said port buffer if said first protocol message fails the first test, and replace said first protocol message in said port buffer with a corresponding failure path protocol message.

2. The network element of claim 1, wherein said test protocol processor is further configured to generate a second value according to a second statistical distribution if said first protocol message passes the first test, compare said second value to a second threshold to determine if the first protocol message passes or fails a second test, associate a delay with said first protocol message if said first protocol message fails the second test, remove said first protocol message from said port buffer, and said step of replacing said first protocol message with said corresponding failure path protocol message occurs after a period of said associated delay.

3. The network element of claim 2, wherein said test protocol processor is further configured to, prior to said replace step: generate a third value according to a third statistical distribution, compare said third value to a third threshold to determine if the first protocol message passes or fails a third test, associate a change in message contents with said failure path protocol message if said first protocol message fails the third test, and provide said associated change in the message contents to said failure path protocol message.

4. The network element of claim 3, wherein said test protocol processor is further configured to, prior to said replace step: generate a fourth value according to a fourth statistical distribution, compare said fourth value to a fourth threshold to determine if the first protocol message passes or fails a fourth test, and associate a change in message type with said failure path protocol message if said first protocol message fails the fourth test, and provide said associated change in message type to said failure path protocol message.

5. The network element of claim 4, wherein said associated change in message type is that of a failure response message.

6. The network element of claim 2, wherein said delay is chosen from a range of delays having a lower delay limit and an upper delay limit.

7. The network element of claim 6, wherein a probability of said delay being a particular delay is defined by a random distribution.

8. The network element of claim 7, wherein said random distribution is selected from a uniform random distribution, a truncated Normal random distribution, a truncated Poisson random distribution, and a truncated exponential random distribution.

9. The network element of claim 1, wherein said first statistical distribution is selected from a uniform random distribution, a truncated Normal random distribution, a truncated Poisson random distribution, and a truncated exponential random distribution.

10. The network element of claim 2, wherein said second statistical distribution is selected from a uniform random distribution, a truncated Normal random distribution, a truncated Poisson random distribution, and a truncated exponential random distribution.

11. The network element of claim 3, wherein said third statistical distribution is selected from a uniform random distribution, a truncated Normal random distribution, a truncated Poisson random distribution, and a truncated exponential random distribution.

12. The network element of claim 4, wherein said fourth statistical distribution is selected from a uniform random distribution, a truncated Normal random distribution, a truncated Poisson random distribution, and a truncated exponential random distribution.

13. The network element of claim 1, wherein said port buffer comprises an input port buffer of said network element and said removing step occurs prior to said standard protocol processor processing said first protocol message.

14. The network element of claim 1, wherein said port buffer comprises an output port buffer of said network element and said removing step occurs prior to transmission of said failure path protocol message from said port.

15. The network element of claim 1, wherein said predetermined message type is one of a plurality of predetermined message types.

16. A method of testing a performance indicator for a network element having a port having a port buffer, a standard protocol processor which processes messages stored in said port buffer, and a test protocol processor having access to said port buffer and configured to execute the method, said method comprising:
generating a first value according to a first statistical distribution when a first protocol message stored in said port buffer corresponds to a predetermined message type;
comparing said first value to a first threshold to determine if the first protocol message passes or fails a first test;
removing said first protocol message from said port buffer if said first protocol message fails the first test; and
replacing said first protocol message in said port buffer with a corresponding failure path protocol message.

17. The method of testing as claimed in claim 16, further comprising:
generating a second value according to a second statistical distribution if said first protocol message passes the first test;
comparing said second value to a second threshold to determine if the first protocol message passes or fails a second test;
associating a delay with said first protocol message if said first protocol message fails the second test;
removing said first protocol message from said port buffer, wherein said step of replacing said first protocol message with said corresponding failure path protocol message occurs after a period of said associated delay.

18. The method of testing as claimed in claim 16, further comprising:
generating a third value according to a third statistical distribution;
comparing said third value to a third threshold to determine if the first protocol message passes or fails a third test;

associating a change in message contents with said failure path protocol message if said first protocol message fails the third test; and providing said associated change in message contents to said failure path protocol message.

19. The method of testing as claimed in claim 16, further comprising:

generating a fourth value according to a fourth statistical distribution;

comparing said fourth value to a fourth threshold to determine if the first protocol message passes or fails a fourth test; and associating a change in message type with said failure path protocol message if said first protocol message fails the fourth test; and providing said associated change in message type to said failure path protocol message.

20. The method of testing as claimed in claim 16, wherein said port buffer comprises an input port buffer of said network element and said removing step occurs prior to said standard protocol processor processing said first protocol message.

21. The method of testing as claimed in claim 16, wherein said port buffer comprises an output port buffer of said network element and said test protocol processor replaces said first protocol message prior to transmission of said failure path protocol message from said port.

* * * * *